April 15, 1930.  H. K. HITCHCOCK  1,754,826
FLUID COOLED ROLL
Filed Jan. 17, 1928
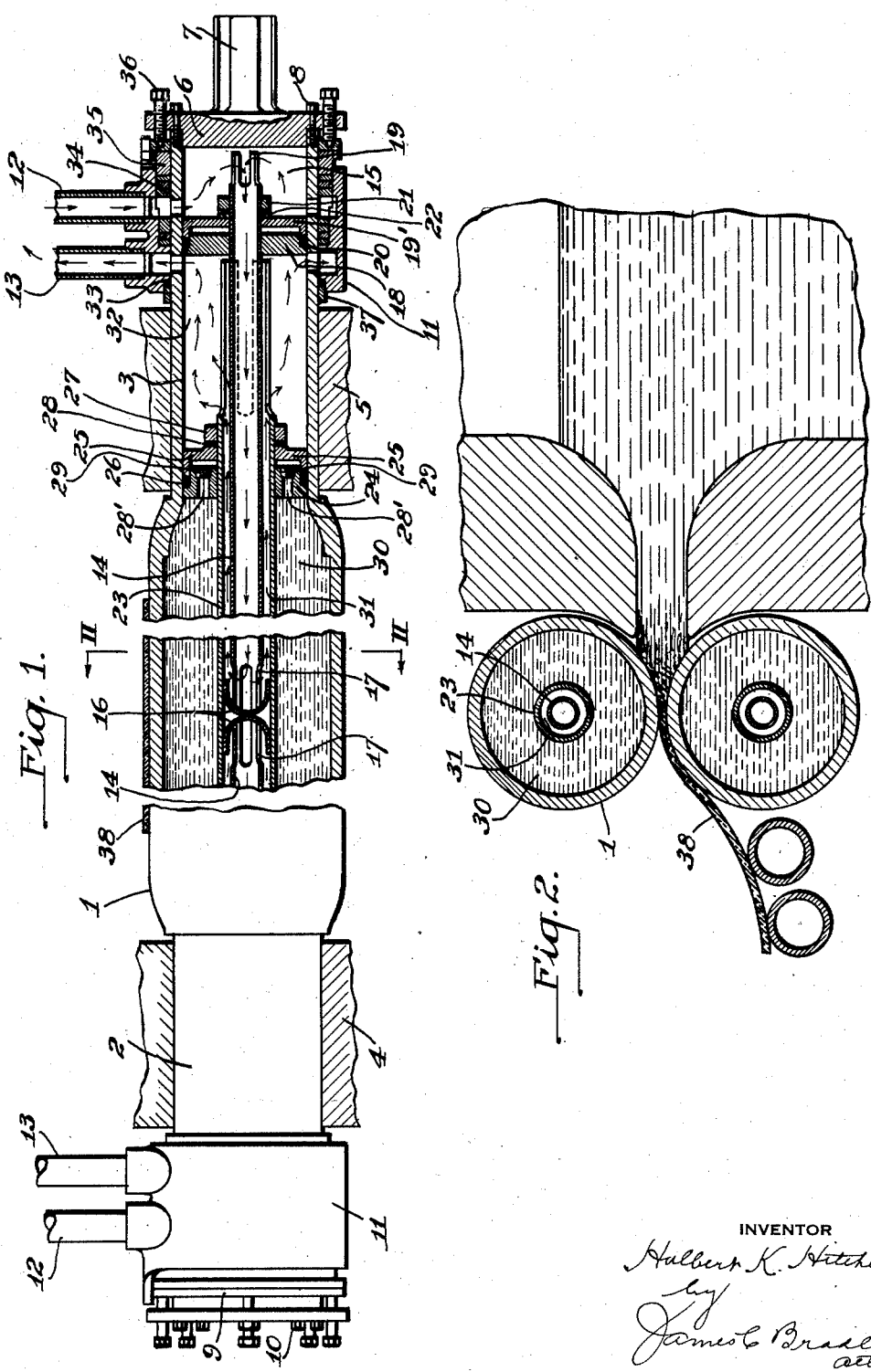
INVENTOR
Hulbert K. Hitchcock
by
James C. Bradley
atty.

Patented Apr. 15, 1930

1,754,826

UNITED STATES PATENT OFFICE

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA

FLUID-COOLED ROLL

Application filed January 17, 1928. Serial No. 247,367.

The invention relates to fluid cooled rolls, designed particularly for use in forming glass into a sheet or series of sheets, although not limited to use in such relation. The invention has for its principal objects; the provision of a roll having improved cooling means wherey the roll can be maintained substantially uniform in temperature throughout that portion of its length which contacts with the glass; the provision of a roll which may be made with a relatively thin casing or shell, so that the difference in temperature between the inner and outer surfaces is reduced to a minimum, and the strains in the shell (due to the differences in temperature) correspondingly reduced; the provision of a roll wherein the cooling effect may be closely regulated or adjusted to suit requirements; and the provision of a roll wherein the bearing portions of the roll (adjacent its ends) may be maintained at a relatively low temperature. One embodiment of the invention is illustrated in the accompanying drawings, wherein:

Figure 1 is a longitudinal section through one of the rolls. And Fig. 2 is a transverse section taken through the rolls in position of use, such section being taken at the position II—II of Fig. 1.

The two rolls, as shown in Fig. 2, are similar in construction throughout, so that a description of one will serve for both. The roll comprises an outer casing 1, preferably of steel or iron having at its ends the bearing portions 2 and 3, which are supported in the journals 4 and 5. Provision is made, as later described, to prevent these bearing portions 2 and 3 from becoming overheated. The right-hand end of the roll is closed by means of the plate 6, having the projection 7 for engagement with a tumbler shaft by means of which the roll is turned. This plate is held in position by means of the bolts 8. The closure plate 9 at the other end of the roll is similar to the one just described, except that this plate is not provided with a driving member corresponding to the member 7, the plate being secured in position by means of the bolts 10. Each end of the roll carries a swivel 11, to which is connected a water inlet pipe 12 and a water outlet pipe 13. Extending longitudinally through the center of the roll are the water supply pipes 14, 14, each communicating at its outer end with a chamber 15, to which water is supplied from the pipe 12. These pipes 14, 14 carry at their inner ends the caps 16, 16, which act as supports for the inner ends of the pipes, such pipes being slotted, as indicated at 17 in order to permit of the discharge of the water therethrough.

Each pipe carries at its outer end a head 18 through which the pipe extends, the end of the pipe lying in the chamber 15 being slotted, as indicated at 19 to permit of an inflow of water. The heads 18 are welded to the pipes 14 and the heads are made tight with respect to the casing 1 by means of the follower members 19' and the packing 20. The followers are pressed inward by means of nuts 21 bearing against the gaskets 22.

Surrounding the pipes 14, 14 is an inner casing member 23, which carries at its ends the heads 24 (preferably welded to the casing), provided with the follower members 25. Packing is provided, as indicated at 26, and the follower members are moved in to tighten the packing by means of the nuts 27 threaded upon the ends of the casing, gaskets 28 being interposed between such nuts and the follower. One of the heads is provided with a pair of perforations 28', by means of which the space between the casings 1 and 23 may be filled, such perforations being closed by the screw plugs 29. The space between the casings 1 and 23 is filled with an alloy 30 having a low fusing point, so that in service, this alloy is in a fluid state. The fusing point of this alloy is preferably somewhere between 150 and 225 deg. F., there being a large number of alloys which are suitable for this purpose. One composition which is suitable for the purpose comprises two parts of bismuth, one of lead and one of tin, the melting point of such compound being about 200 deg. F. Another alloy melting at a somewhat higher temperature and suitable for the purpose comprises three parts of lead, five of tin, and eight of bismuth. There is a considerable amount of expansion and contraction in this metal due to varying heat conditions and this is taken care of by the heads 24, which are secured to the casing 23 and have sliding engagement with the casing 1, although this arrangement might be reversed, if desired. This fusible metal acts as a cooling medium for the casing 1, being itself cooled from the inner casing 23. The inner casing is cooled by the flow of liquid from the pipes 12, which enters the chambers 15 flowing inward through the pipes 14 and discharging to the space 31 between the pipes 14 and casing 23. The liquid then flows outwardly to the chambers 32 between the heads 18 and 24 and is discharged through the pipes 13.

The swivels 11 which carry the pipes 12 and 13 are made tight upon the casing 1 by means of the packing 33 and 34, the packing 34 being compressed by means of the followers 35 pressed inward by the bolts 36 extending through the flanges of the plates 6. The packing 33 bears at its inner side against the ring 37, which is welded to the casing 1. The bearing portions 2 and 3 are kept relatively cool by the water circulating through the chamber 32, so that these parts are prevented from becoming overheated. The water which is employed for cooling the rolls is preferably used over and over again, the outflow from the pipes 13 being conducted through suitable cooling coils and then returned through the pipes 12, this being a matter of economy, which is recognized in the art. Apparatus for circulating the fluid and cooling it may be employed similar to that in my copending application, Serial Number 247,368, of even date herewith and the control of the temperature may also be made automatic, if desired, by means similar to that shown in said application. The construction herein described provides for very uniform cooling for a portion of the casing 1, which engages the glass sheet 38, thus reducing the tendency of the roll to warp. This uniform cooling effect is due to the use of the fluid metal 30 in contact with the casing or shell, as this metal because of its conductivity and because of its fluidity is maintained practically at the same temperature throughout its entire body, the rotation of the roll tending to keep the molten fluid in a state of agitation and this promotes interchanges of temperature between various parts of the body of metal, which might otherwise become locally cooled or overheated. This body of molten metal interposed between the cooling liquid and the shell 1 obviates any violent chilling of the casing by the cooling fluid and permits of the use of a relatively thin shell or casing. There is less tendency of such a shell or casing warping, since the flow of heat through the thin casing is so rapid that there is not the wide difference in temperature between the outer surface of the casing and the inner surface, such as occurs with a roll having a thick wall or casing. The relatively low temperature difference minimizes the tendency to warp and impose strain upon the casing, so that the casing maintains its true cylindrical shape and is not subject to cracking and overheating upon its outer surface as is the case with a roll having a casing several inches in thickness. Other advantages incident to the construction will be apparent to those skilled in the art.

What I claim is:

1. In a cooling roll, the combination with a cylindrical outer casing, an inner casing mounted to turn with the outer casing concentric therewith and spaced away from the outer casing to provide a chamber between the two casings, a body of metal fusible at a relatively low temperature filling said chamber, and means for circulating a cooling fluid through the inner casing.

2. In a cooling roll, the combination with a cylindrical outer casing, having bearing portions adjacent its ends, an inner casing mounted to turn with the outer casing concentric therewith and spaced away from the outer casing to provide a chamber between the two casings, a body of metal fusible at a relatively low temperture filling said chamber, and means for circulating a cooling fluid through the inner casing, said chamber terminating short of said bearing portions.

3. In a cooling roll, the combination with a cylindrical outer casing, having bearing portions adjacent its ends, an inner casing mounted to turn with the outer casing concentric therewith and spaced away from the outer casing to provide a chamber between the two casings, a body of metal fusible at a relatively low temperature filling said chamber, said chamber terminating short of said bearing portions, and means for circulating a cooling fluid through said inner casing and along the inner surface of the outer casing at said bearing portions.

4. In a cooling roll, the combination with a cylindrical outer casing, an inner casing concentric therewith and spaced away from the outer casing to provide a chamber between the two casings, a body of metal fusible at a relatively low temperature filling said chamber, fluid supply pipes inside the second casing spaced away therefrom to provide a cooling chamber and opening into said cooling chamber adjacent the center of the roll, means for supplying a cooling fluid under pressure to the outer ends of said pipes, and means for withdrawing the fluid from the ends of said cooling chamber.

5. In a cooling roll, the combination with a cylindrical outer casing, an inner casing concentric therewith and spaced away from the outer casing to provide a chamber between the two casings, closure heads for said chamber at the ends of the inner casing secured to one of said casings and having sliding engagement with the other casing with packing means to prevent leakage between the closure head and the casing with which it has sliding engagement, a body of metal fusible at a relatively low temperature filling said chamber, and means for circulating a cooling fluid through the inner casing.

6. In a cooling roll, the combination with a cylindrical outer casing, an inner casing mounted to turn with the outer casing concentric therewith and spaced away from the outer casing to provide a chamber between the two casings, a body of metal fusible at a temperature less than 300 degrees F. filling said chamber, and means for circulating a cooling fluid through the inner casing.

In testimony whereof, I have hereunto subscribed my name this 13th day of January, 1928.

HALBERT K. HITCHCOCK.